United States Patent
Fukui et al.

(10) Patent No.: US 9,436,538 B2
(45) Date of Patent: Sep. 6, 2016

(54) COMPUTER-READABLE RECORDING MEDIUM, LOG ACQUISITION DEVICE, AND LOG ACQUISITION METHOD

(71) Applicant: FUJITSU LIMITED, Kawasaki (JP)

(72) Inventors: Nobuhiko Fukui, Bunkyo (JP); Hideya Ikeda, Urayasu (JP); Minoru Yamamoto, Urayasu (JP)

(73) Assignee: FUJITSU LIMITED, Kawasaki (JP)

( * ) Notice: Subject to any disclaimer, the term of this patent is extended or adjusted under 35 U.S.C. 154(b) by 164 days.

(21) Appl. No.: 13/966,687

(22) Filed: Aug. 14, 2013

(65) Prior Publication Data
US 2014/0122943 A1    May 1, 2014

(30) Foreign Application Priority Data

Oct. 31, 2012   (JP) .................. 2012-241346

(51) Int. Cl.
*G06F 11/07*   (2006.01)

(52) U.S. Cl.
CPC ....... *G06F 11/0787* (2013.01); *G06F 11/0709* (2013.01); *G06F 11/0769* (2013.01); *G06F 11/0784* (2013.01)

(58) Field of Classification Search
CPC ........... G06F 11/0781; G06F 11/0778; G06F 11/0769; G06F 11/323; G06F 11/324; G06F 21/552
See application file for complete search history.

(56) References Cited

U.S. PATENT DOCUMENTS

| | | | |
|---|---|---|---|
| 7,640,337 B1 * | 12/2009 | Fultz et al. | 709/224 |
| 8,694,834 B2 * | 4/2014 | Thompson | 714/45 |
| 8,949,195 B1 * | 2/2015 | Lekkalapudi et al. | 707/672 |
| 2005/0139673 A1 | 6/2005 | Yokoyama | |
| 2006/0048004 A1 * | 3/2006 | Kawashima | 714/23 |
| 2012/0215907 A1 * | 8/2012 | Chung | 709/224 |

FOREIGN PATENT DOCUMENTS

| | | |
|---|---|---|
| JP | 10-136961 | 5/1998 |
| JP | 2002-163129 | 6/2002 |
| JP | 2005-191686 | 7/2005 |
| JP | 2008-583 | 1/2008 |
| JP | 2008-15733 | 1/2008 |
| JP | 2008-95655 | 4/2008 |
| JP | 2009-163505 | 7/2009 |

OTHER PUBLICATIONS

Basic Shell Commands by Jeremy Sanders published Oct. 2011 https://www-xray.ast.cam.ac.uk/~jss/lecture/computing/notes/out/commands_basic/.*
Japanese Patent Office Action mailed Mar. 15, 2016 in corresponding Japanese Patent Application No. 2012-241346.

* cited by examiner

*Primary Examiner* — Joseph Schell
(74) *Attorney, Agent, or Firm* — Staas & Halsey LLP (57) ABSTRACT

According to one aspect, a non-transitory computer-readable recording medium stores therein a log acquisition program causing a computer to execute a process. The process includes receiving information for designating multiple functions of an application for which logs are to be acquired and designating a log detail level with respect to each of the multiple functions; and acquiring a log of the application with a corresponding log detail level with respect to each of the multiple functions designated.

5 Claims, 8 Drawing Sheets

| MONITORING MODE | LEVEL OF PRIORITY | WEB LAYER | BUSINESS LOGIC LAYER | DATA ACCESS LAYER |
|---|---|---|---|---|
| OPERATION STATISTICS | 0 | D2 | D0 | D0 |
| OPERATION TRACE | 1 | D2 | D2 | D0 |
| BOTTLENECK INVESTIGATION | 2 | D2 | D2 | D2 |
| DETAIL INVESTIGATION | 3 | D1 | D2 | D3 |

| FUNCTION | DETAIL LEVEL |
|---|---|
| A | D0 |
| B | D1 |
| C | D2 |
| ⋮ | ⋮ |

| MONITORING CONDITION | MONITORING MODE | LEVEL OF PRIORITY |
|---|---|---|
| OPERATION OF FUNCTION A | BOTTLENECK INVESTIGATION | 2 |
| OPERATION OF USER 5 | OPERATION TRACE | 1 |
| COMMON PART α | DETAIL INVESTIGATION | 3 |
| OTHERS (DEFAULT) | OPERATION STATISTICS | 0 |

FIG.5

| MONITORING MODE | LEVEL OF PRIORITY | WEB LAYER | BUSINESS LOGIC LAYER | DATA ACCESS LAYER |
|---|---|---|---|---|
| OPERATION STATISTICS | 0 | D2 | D0 | D0 |
| OPERATION TRACE | 1 | D2 | D2 | D0 |
| BOTTLENECK INVESTIGATION | 2 | D2 | D2 | D2 |
| DETAIL INVESTIGATION | 3 | D1 | D2 | D3 |

COMPUTER-READABLE RECORDING MEDIUM, LOG ACQUISITION DEVICE, AND LOG ACQUISITION METHOD

CROSS-REFERENCE TO RELATED APPLICATION

This application is based upon and claims the benefit of priority of the prior Japanese Patent Application No. 2012-241346, filed on Oct. 31, 2012, the entire contents of which are incorporated herein by reference.

FIELD

The embodiments discussed herein are related to a computer-readable recording medium, a log acquisition device, and a log acquisition method.

BACKGROUND

Conventional software exists that acquires detailed operation logs of an external application. With such software, when the source code of an application is compiled, or before an application is executed, an operation to acquire logs is embedded in each method by using an aspect-oriented technique. Furthermore, this kind of software analyzes the input/output of a method and stores it as log information.

Patent Document 1: Japanese Laid-open Patent Publication No. 2009-163505

The above-described software has the following problem when a user, such as a system user or administrator, who is not so familiar with the system when compared to the system developer, changes the log acquisition level. Specifically, with the above-described software, it is difficult for a system user or administrator to select a log acquisition level, because they are not familiar with the internal configuration of the system. Therefore, with the above-described software, it is difficult to designate a log acquisition level from a perspective that is easily understandable.

SUMMARY

According to an aspect of an embodiment, a non-transitory computer-readable recording medium stores therein a log acquisition program causing a computer to execute a process. The process includes receiving information for designating multiple functions of an application for which logs are to be acquired and designating a log detail level with respect to each of the multiple functions; and acquiring a log of the application with a corresponding log detail level with respect to each of the multiple functions designated.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to accompanying drawings. The disclosed technology is not limited to the embodiments.

[a] First Embodiment

Figure 1:
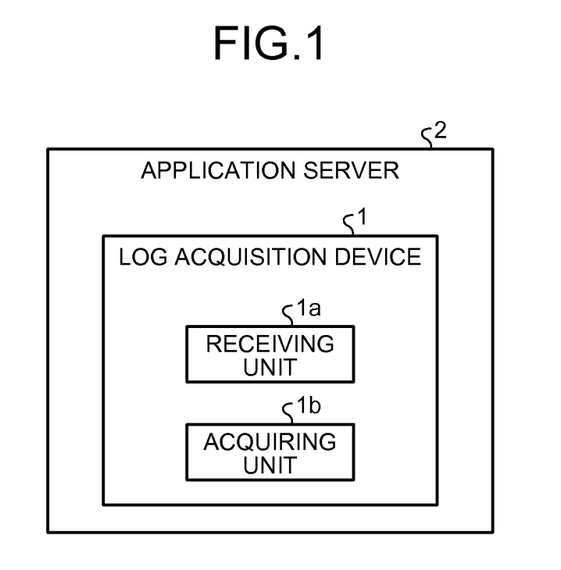
FIG. 1 is a diagram that illustrates the configuration of an application server according to a first embodiment.

An explanation is given of a log acquisition device according to a first embodiment. FIG. 1 is a diagram that illustrates an exemplary configuration of an application server 2 according to the first embodiment. The application server 2 executes an application. Furthermore, as illustrated in FIG. 1, the application server 2 includes a log acquisition device 1. The log acquisition device 1 includes a receiving unit 1a and an acquiring unit 1b.

The receiving unit 1a receives information for designating multiple functions of an application for which logs are to be acquired and designating a log detail level with respect to each of the functions.

The acquiring unit 1b acquires a log of an application with respect to each of the designated functions with a corresponding log detail level.

Figure 2:
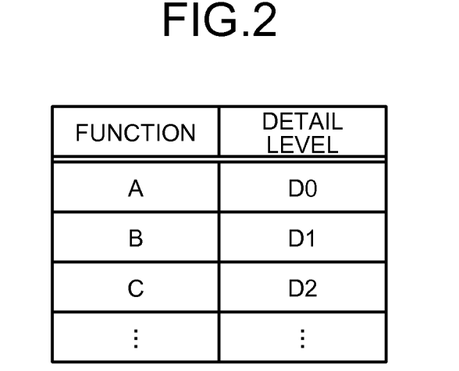
FIG. 2 is a diagram that illustrates an example of information received by a log acquisition device according to the first embodiment.

FIG. 2 is a diagram that illustrates an example of information received by the log acquisition device 1 according to the first embodiment. The information illustrated in the example of FIG. 2 indicates information for designating the function "A" of an application for which logs are to be acquired and designating the log detail level "D0" with respect to the function "A". Furthermore, the information illustrated in the example of FIG. 2 indicates information for designating the function "B" of an application for which logs are to be acquired and designating the log detail level "D1" with respect to the function "B". Moreover, the information illustrated in the example of FIG. 2 indicates information for designating the function "C" of an application for which logs are to be acquired and designating the log detail level "D2" with respect to the function "C".

When receiving the information illustrated in the example of FIG. 2, the log acquisition device 1 acquires an application log with respect to the designated function "A" with the corresponding log detail level "D0". Furthermore, when receiving the information illustrated in the example of FIG. 2, the log acquisition device 1 acquires an application log with respect to the designated function "B" with the corresponding log detail level "D1". When receiving the information illustrated in the example of FIG. 2, the log acquisition device 1 acquires an application log with respect to the designated function "C" with the corresponding log detail level "D2".

Thus, the log acquisition device 1 according to the first embodiment acquires an application log with respect to each designated function with a corresponding log detail level. Therefore, with the log acquisition device 1 according to the first embodiment, it is possible to designate a log acquisition level from a perspective that is easily understandable.

Second Embodiment

Figure 3:
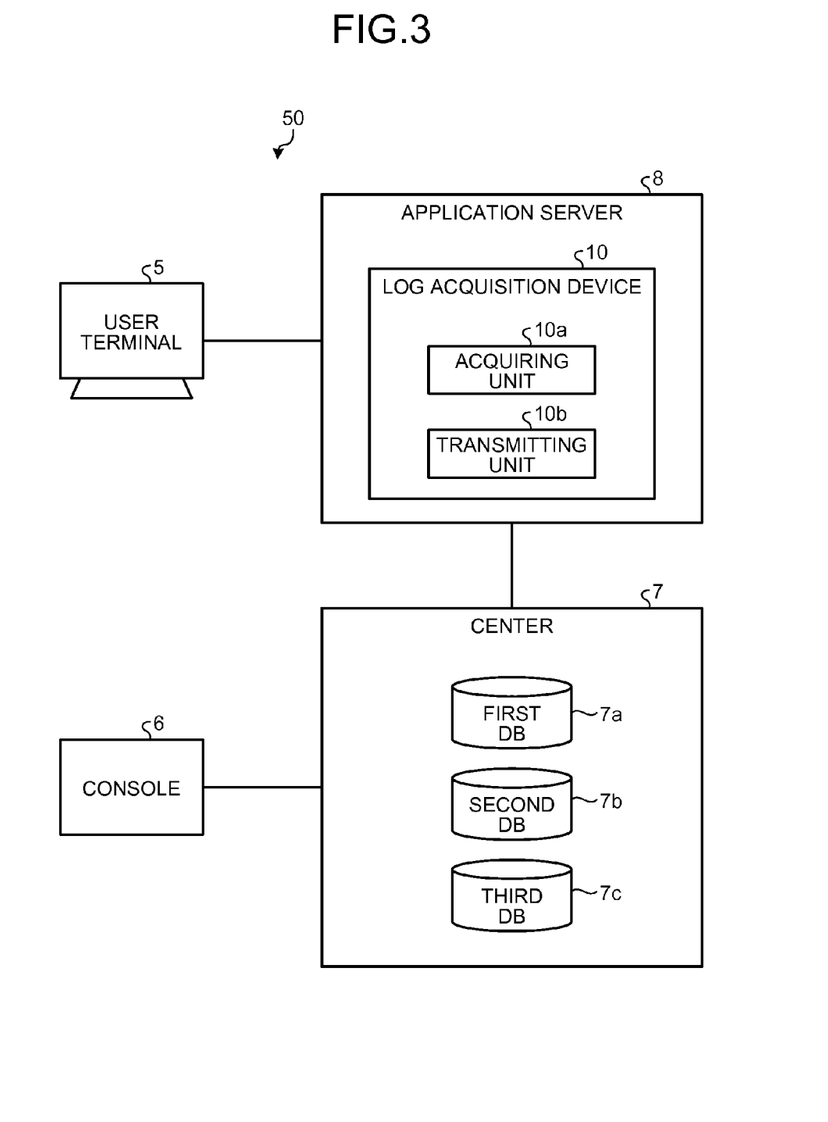
FIG. 3 is a diagram that illustrates an exemplary configuration of a system that uses a log acquisition device according to a second embodiment.

Next, an explanation is given of a log acquisition device according to a second embodiment. FIG. 3 is a diagram that illustrates an exemplary configuration of a system that uses the log acquisition device according to the second embodiment. As illustrated in FIG. 3, a system 50 includes a user terminal 5, a console 6, a center 7, and an application server 8.

The user terminal 5 requests the application server 8 to execute an application and then acquires the execution result of the application from the application server 8. For example, the user terminal 5 transmits, to the application server 8, an instruction to execute the application designated by a user and then acquires the execution result from the application server 8.

The console 6 is a terminal that requests the center 7 to do various types of processing. For example, the console 6 receives operations from a system user or administrator and receives records to be registered in a first DB 7a, which will be described later. The console 6 then transmits the received record to the center 7. Thus, a record is added to the first DB 7a of the center 7. In the present embodiment, as described above, a user, such as a system user or administrator, can add records to the first DB 7a, which will be explained later, via the console 6. For example, a user can designate the details of the item "monitoring condition", the details of the item "monitoring mode", and the details of the item "level of priority", which will be described later. Thus, it is possible to designate a log acquisition level from a perspective that is easily understandable, as described later. According to the present embodiment, it is also possible for a user to delete or update records in the first DB 7a, which will be explained later, via the console 6.

For example, when receiving a user's operation, the console 6 can transmit a record to the center 7 so that the record is registered in the first DB 7a, which is the record in which the details of the item "monitoring condition" are the combination of a function ID, screen ID, and button ID, which will be described later. At this point, each of the function ID, the screen ID, and the button ID can be designated by using a wildcard, or the like. Moreover, when receiving a user's operation, the console 6 can transmit a record to the center 7 so that the record is registered in the first DB 7a, which is the record in which the details of the item "monitoring condition" are the user ID. Furthermore, when receiving a user's operation, the console 6 can transmit a record to the center 7 so that the record is registered in the first DB 7a, which is the record in which the details of the item "monitoring condition" are the combination of a class name and a method name for identifying a common part.

The center 7 stores various types of information in databases (DBs). The center 7 includes the first DB 7a, a second DB 7b, and a third DB 7c.

Figure 4:
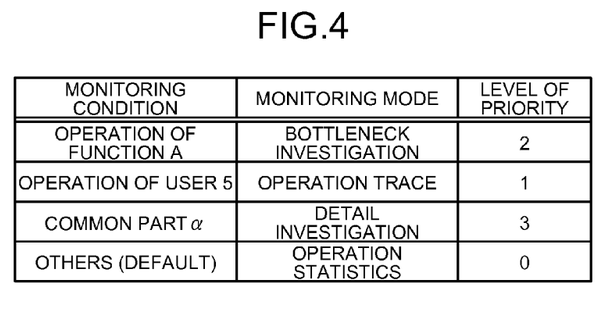
FIG. 4 is a diagram that illustrates an example of data formation of a first DB.

FIG. 4 is a diagram that illustrates an example of data formation of the first DB. As illustrated in the example of FIG. 4, the items "monitoring condition", "monitoring mode", and "level of priority" are registered in the first DB 7a such that they are related to one another. The item "monitoring condition" has registered therein a condition for selecting a monitoring mode. The item "monitoring mode" has registered therein the name of a monitoring mode. The item "level of priority" has registered therein a value that indicates, if the value is large, a monitoring mode has a higher level of priority.

The first record in the first DB 7a illustrated in the example of FIG. 4 indicates that the level of priority "2" is set to a process to acquire logs in the monitoring mode "bottleneck investigation" set if the function "A" is operated by a user. The monitoring mode "bottleneck investigation" is, for example, a mode used for acquiring logs that are used when an investigation is conducted into which data access is delayed. The second record in the first DB 7a illustrated in the example of FIG. 4 indicates that the level of priority "1" is set to a process to acquire logs in the monitoring mode "operation trace" set if a user with the user ID "5" is logged in. The monitoring mode "operation trace" is, for example, a mode used for acquiring logs that are used when an investigation is conducted into which user is performing which operation. The third record in the first DB 7a illustrated in the example of FIG. 4 indicates that the level of priority "3" is set to a process to acquire logs in the monitoring mode "detail investigation" set if the method being executed is a common part α. The monitoring mode "detail investigation" is a mode used for acquiring logs that are used when an investigation is conducted in more detail into which data access is delayed compared to, for example, a "bottleneck investigation". The fourth record in the first DB 7a illustrated in the example of FIG. 4 indicates that the level of priority "0" is set to a process to acquire logs in the monitoring mode "operation statistics" set if a default is set. The monitoring mode "operation statistics" is a mode used for acquiring logs that are used when an investigation is conducted into, for example, how the system is being used.

Figure 5:
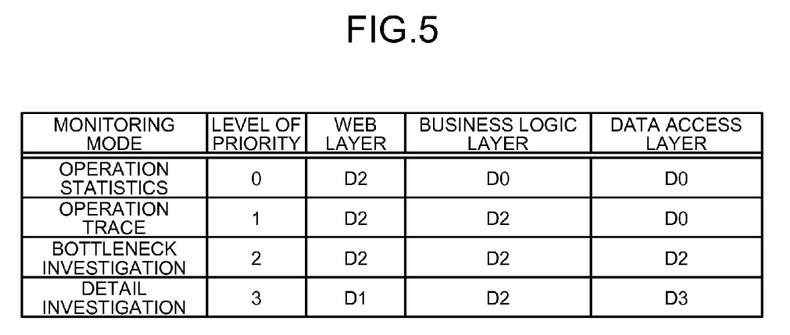
FIG. 5 is a diagram that illustrates an example of data formation of a second DB.

FIG. 5 is a diagram that illustrates an example of data formation of the second DB. As illustrated in the example of FIG. 5, the items "monitoring mode name", "level of priority", "Web layer", "business logic layer", and "data access layer" are registered in the second DB 7b such that they are related to one another.

Here, an explanation is given of each of the items "Web layer", "business logic layer", and "data access layer". "Web layer" has registered therein a monitoring detail level set if the method being executed belongs to the Web layer, which will be described later. Here, the monitoring detail level refers to a log detail level. In the present embodiment, an explanation is given of a case where the monitoring detail level has four levels. For example, in the present embodiment, the monitoring detail level has four levels, i.e., "D0" to "D3", in which "D3" is the highest detail level and "D0" is the lowest detail level. The monitoring detail level "D0" indicates that, for example, logs are not acquired. The monitoring detail level "D1" indicates that, for example, call information, such as the fact that the method has been executed and the processing time of the method, is acquired as logs. Furthermore, the monitoring detail level "D2" indicates that, for example, input/output information, such as parameter values or return values, are acquired as logs. Moreover, the monitoring detail level "D3" indicates that, for example, logs are acquired in a more detailed level compared to "D2".

Furthermore, "business logic layer" has registered therein a monitoring detail level set if the method being executed belongs to the business logic layer, which will be described later. Moreover, "data access layer" has registered therein a monitoring detail level set if the method being executed belongs to the data access layer, which will be described later.

Logs transmitted from a log acquisition device 10 are registered in the third DB 7c.

When the center 7 receives a record that is transmitted from the console 6 and is to be registered in the first DB 7a, the center 7 registers the received record in the first DB 7a. The center 7 then notifies the log acquisition device 10 of the new record registered in the first DB 7a. Thus, it is possible that the contents registered in the first DB 7a of the center 7 coincide with the copied contents of the first DB 7a that are stored in the log acquisition device 10.

Similarly, the center 7 deletes or updates records registered in the first DB 7a in response to a record deletion instruction or record update instruction transmitted from the console 6. The center 7 then transmits, to the log acquisition device 10, information that the record has been deleted or the record has been updated. Thus, it is possible that the contents registered in the first DB 7a of the center 7 coincide with the copied contents of the first DB 7a that are stored in the log acquisition device 10.

Further, when receiving a log that is transmitted from the log acquisition device 10, the center 7 registers the received log in the third DB 7c. Thus, the center 7 can store logs.

With reference back to FIG. 3, the application server 8 executes an application. The log acquisition device 10 then acquires a log of the application executed by the application server 8.

Figure 6:
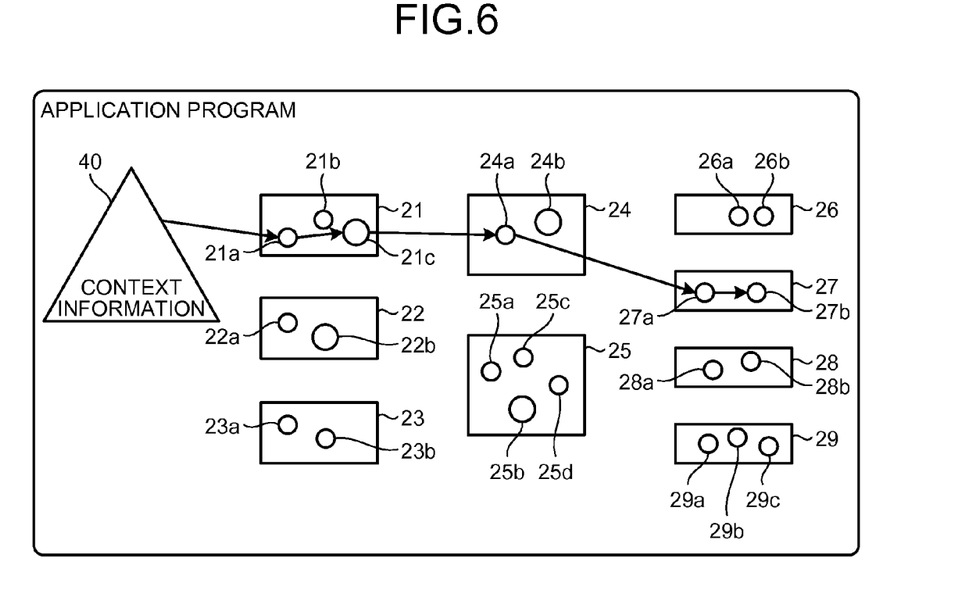
FIG. 6 is a diagram that illustrates an example of an application according to the second embodiment.

Here, an explanation is first given of an application executed by the application server 8. FIG. 6 is a diagram that illustrates an example of an application program according to an embodiment. As illustrated in FIG. 6, the application program is subdivided into methods (subroutines, functions). The example of FIG. 6 illustrates a case where the application program is subdivided into multiple methods, i.e., methods 21a to 21c in class 21, methods 22a to 22b in class 22, and methods 23a to 23b in class 23. Furthermore, the example of FIG. 6 illustrates a case where the application program is subdivided into multiple methods, i.e., methods 24a to 24b in class 24, methods 25a to 25d in class 25, methods 26a to 26b in class 26, and methods 27a to 27b in class 27. Moreover, the example of FIG. 6 illustrates a case where the application program is subdivided into multiple methods, i.e., methods 28a to 28b in class 28 and methods 29a to 29c in class 29.

Here, an explanation is given of a case where a user presses a screen button by using an operation receiving device, such as a keyboard or mouse, the screen button being displayed on a display device when an application program is executed. In such a case, context information 40 is generated as illustrated in FIG. 6. The context information 40 includes a logged-in user ID, a function identification ID for identifying a function/screen/button of the operated application, or the like.

The function identification ID includes a function ID that indicates a function of the application operated, a screen ID that indicates a screen of the application operated, and a button ID that indicates a button of the application operated. A function may include multiple screens, and a screen may include multiple buttons. Therefore, the relation among the functions, screens, and buttons can be represented by using a tree structure.

When the context information is generated, the methods are continuously called so that the operation is executed. For instance, the example of FIG. 6 illustrates a case where the methods are executed, starting with the method 21a, then the method 21c, the method 24a, the method 27a, and finally the method 27b. Each method belongs to a single class. Therefore, a method can be uniquely identified by using the combination of a class name and a method name.

In the present embodiment, when the source code of an application is compiled, or before an application is executed, an operation to acquire logs is embedded in each method by using an aspect-oriented technique. For example, the setting is made to each method such that, when each method is executed, an agent that performs the log acquisition operation is called. Due to such settings, for example, when the methods are continuously called and executed as illustrated in the example of FIG. 6, the agents are called, starting with that of the method 21a, then the method 21c, the method 24a, the method 27a, and finally the method 27b. Every time an agent is called, the agent performs the operation to acquire logs.

Here, the log acquisition device 10 illustrated in FIG. 3 corresponds to the above-described agent. Specifically, the log acquisition device 10 performs an operation to acquire logs each time a method is executed.

Figure 7:
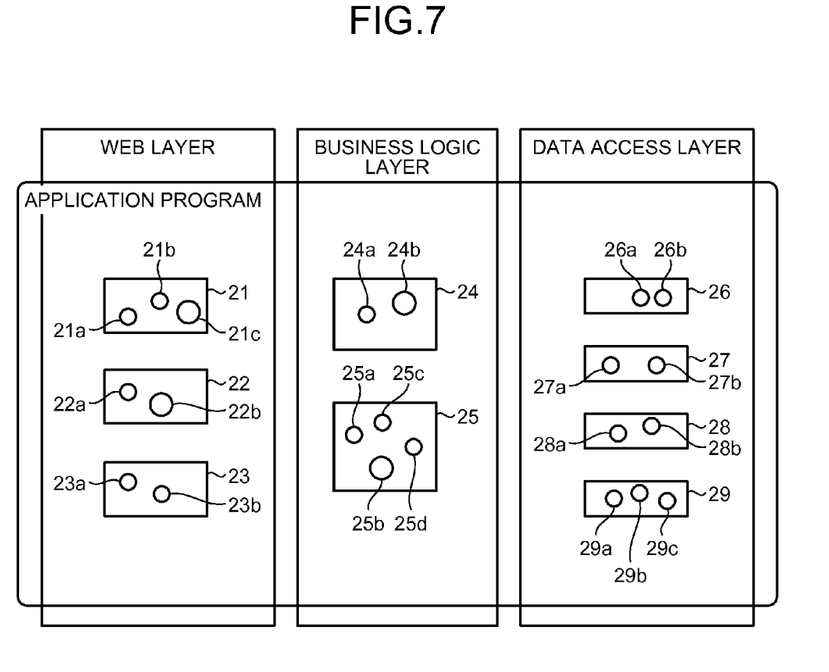
FIG. 7 is a diagram that illustrates an example of an operation performed by the log acquisition device according to the second embodiment.

Furthermore, in the present embodiment, each method is sorted into layers called monitoring layers depending on the type of operation of the method. FIG. 7 is a diagram that illustrates an example of an operation performed by the log acquisition device according to the second embodiment. For example, as illustrated in FIG. 7, if the operation of a method is an operation to perform screen displaying, the setting is made such that this method belongs to the monitoring layer called "Web layer". Furthermore, as illustrated in FIG. 7, if the type of operation of the method is a business logic operation, the setting is made such that this method belongs to the monitoring layer called "business logic layer". Furthermore, as illustrated in FIG. 7, if the type of method is an operation such as an operation to access the database, the setting is made such that this method belongs to the monitoring layer called "data access layer".

A method that acquires logs by calling an agent belongs to any one of the monitoring layers. On the other hand, a method that does not acquire logs, i.e., a method that does not call an agent does not belong to any of the monitoring layers.

Next, an explanation is given of an example of an operation performed by the log acquisition device 10 that corresponds to an agent. The log acquisition device 10 includes an acquiring unit 10a and a transmitting unit 10b. As described above, when the log acquisition device 10 is called by the method being executed, the log acquisition device 10 extracts all the monitoring conditions that match the context information 40 from the first DB 7a. For example, if the contents registered in the first DB 7a are the contents registered as illustrated in FIG. 4, and if the context information 40 includes the function ID indicating that the function A of the application has been executed, the acquiring unit 10a of the log acquisition device 10 performs the following operation. Specifically, the acquiring unit 10a extracts the record that includes the monitoring condition "operation of function A". Furthermore, for example, if the contents registered in the first DB 7a are the contents registered as illustrated in FIG. 4, and if the context information 40 includes the user ID "5", the acquiring unit 10a extracts the record that includes the monitoring condition "operation of user 5".

Furthermore, if the contents registered in the first DB 7a are the contents registered as illustrated in FIG. 4, and if the method being called and executed is the common part α, the acquiring unit 10a performs the following operation. Specifically, the acquiring unit 10a extracts the record that includes the monitoring condition "common part α".

The acquiring unit 10a is able to extract, with respect to a single application, all the monitoring conditions that match the context information 40 from the first DB 7a and then store the extracted records in a cache so that a record stored in the cache can be used for subsequent processing.

Next, the acquiring unit 10a selects a monitoring mode with the highest level of priority from the monitoring modes that are associated with the monitoring conditions in the extracted records. For example, if the first to third records in the first DB 7a illustrated in FIG. 4 are extracted, the acquiring unit 10a selects the monitoring mode "detail investigation" that has the highest level of priority.

The acquiring unit 10a then determines, by using the second DB 7b, a monitoring detail level that is associated with the monitoring layer name of the called method and with the selected monitoring mode. For example, if the contents registered in the second DB 7b are the contents registered as illustrated in FIG. 5, and if the monitoring layer name of the called method is "Web layer", and if the selected monitoring mode is "operation statistics", the acquiring unit 10a performs the following operation. Specifically, the acquiring unit 10a determines the monitoring detail level "D2".

The acquiring unit 10a then acquires a log with the determined monitoring detail level. For example, if the monitoring detail level "D2" is determined, the acquiring unit 10a acquires a log with the monitoring detail level "D2". The acquiring unit 10a then stores the acquired log in an internal memory.

The transmitting unit 10b transmits, to the center 7, the log stored in the internal memory when it is time to transmit a log (transmission time). For example, the transmitting unit 10b transmits a log at intervals of 30 seconds.

Figure 8:
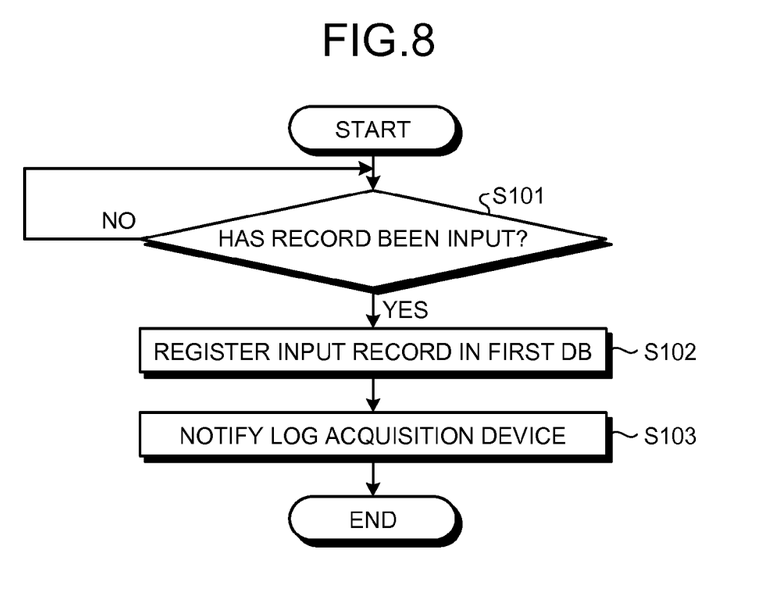
FIG. 8 is a flowchart that illustrates the steps of a reception process according to the second embodiment.

Next, an explanation is given of the flow of a process performed by the center 7 according to the present embodiment. FIG. 8 is a flowchart that illustrates the steps of a reception process according to the second embodiment. The reception process is repeatedly performed at an interval of, for example, a predetermined time period.

As illustrated in FIG. 8, the center 7 determines whether a record to be registered in the first DB 7a has been input from the console 6 (S101). If it has not been input (No at S101), the center 7 performs a determination at S101 again. Conversely, if it has been input (Yes at S101), the center 7 registers the input record in the first DB 7a (S102). The center 7 then notifies the log acquisition device 10 of the new record registered in the first DB 7a (S103) and then terminates the process.

Figure 9:
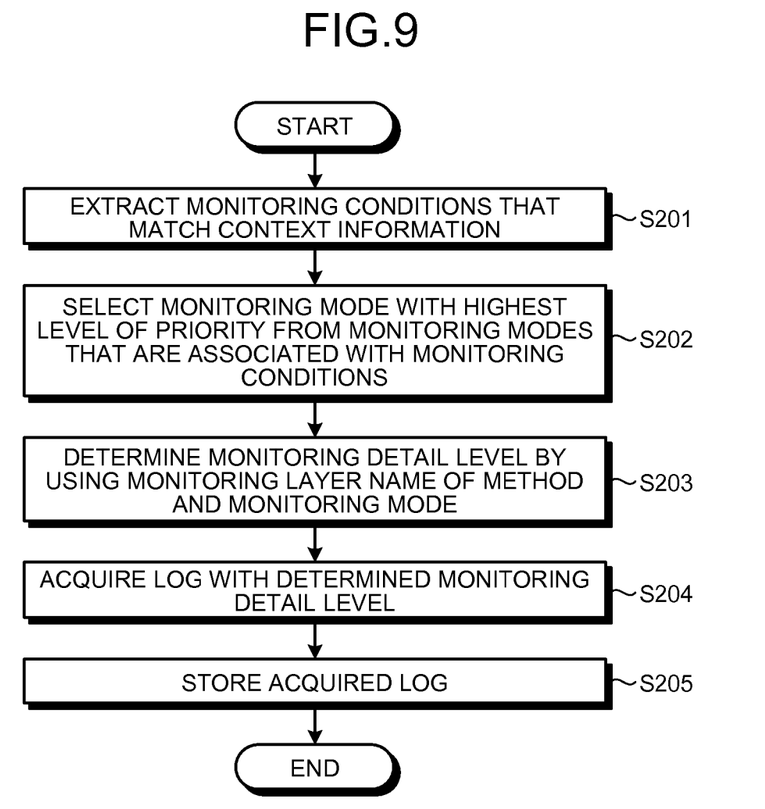
FIG. 9 is a flowchart that illustrates the steps of a log acquisition process according to the second embodiment.

Next, an explanation is given of the flow of a process performed by the log acquisition device 10 according to the present embodiment. FIG. 9 is a flowchart that illustrates the steps of a log acquisition process according to the second embodiment. For example, when a method calls an agent, the log acquisition device 10, which corresponds to the agent, performs the log acquisition process.

As illustrated in FIG. 9, the log acquisition device 10 extracts all the monitoring conditions that match the context information 40 from the first DB 7a (S201). The acquiring unit 10a then selects a monitoring mode with the highest level of priority from the monitoring modes that are associated with the monitoring conditions in the extracted records (S202). The acquiring unit 10a then determines, by using the second DB 7b, a monitoring detail level that is associated with the monitoring layer name of the called method and with the selected monitoring mode (S203). The acquiring unit 10a acquires a log with the determined monitoring detail level (S204). The acquiring unit 10a then stores the acquired log in the internal memory (S205) and terminates the process.

Figure 10:
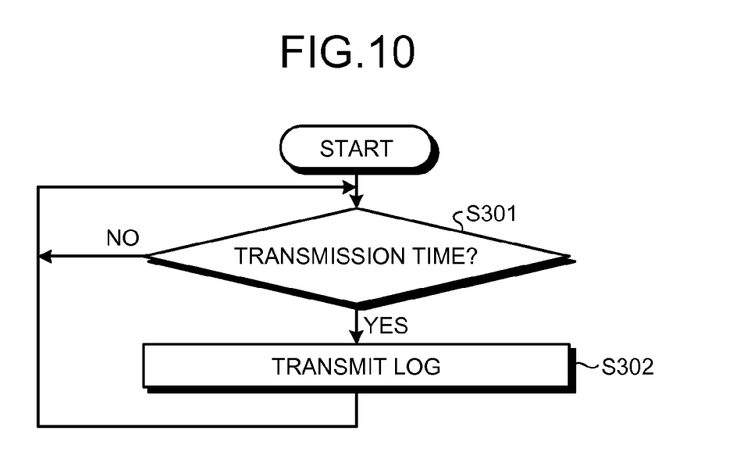
FIG. 10 is a flowchart that illustrates the steps of a log transmission process according to the second embodiment.

Next, an explanation is given of the flow of a process performed by the log acquisition device 10 according to the present embodiment. FIG. 10 is a flowchart that illustrates the steps of a log transmission process according to the second embodiment. The log transmission process is repeatedly performed at an interval of, for example, a predetermined time period.

The transmitting unit 10b determines whether it is time to transmit a log (transmission time) (S301). If it is not the transmission time (No at S301), the transmitting unit 10b performs a determination at S301 again. Conversely, if it is the transmission time (Yes at S301), the transmitting unit 10b transmits the log stored in the internal memory to the center 7 (S302) and returns to S301.

As described above, the log acquisition device 10 according to the present embodiment receives the designation of the details of the item "monitoring condition", which is easily understandable for users as illustrated in FIG. 4. With respect to the received designation, the log acquisition device 10 according to the present embodiment acquires a log with the detail level that corresponds to the method being executed. Thus, with the log acquisition device 10 according to the present embodiment, it is possible to designate a log acquisition level from a perspective that is easily understandable.

According to the present embodiment, a function includes multiple screen functions. Furthermore, according to the present embodiment, a layered system is configured in which multiple screens include an input/output item function. With the log acquisition device 10 according to the present embodiment, if different detail levels are selected for different layers with respect to a given function, the highest detail level among the different detail levels is used to acquire application logs. Thus, if multiple detail levels are selected, application logs can be acquired with the highest detail level.

The embodiments of the disclosed device have been described above; however, the present invention may be embodied in various different forms other than the embodiments described above. In the following, another embodiment included in the present invention will be explained.

Among the processes described in the embodiments, all or some of the processes that are automatically performed as described above can be performed manually. Furthermore, among the processes described in the embodiments, all or some of the processes that are manually performed as described above can be performed automatically by using a well-known method.

The operation at each step of each process described in the embodiments may be arbitrarily subdivided or combined together depending on various types of loads or usage. Moreover, steps may be omitted.

The order of operations at each step of each process described in the embodiments may be changed depending on various types of loads or usage.

The components of each device illustrated are functionally conceptual and do not necessarily need to be physically configured as illustrated in the drawings. Specifically, specific forms of separation and combination of each device are not limited to those depicted in the drawings. A configuration may be such that all or some of devices are functionally or physically separated or combined in an arbitrary unit depending on various types of loads or usage.

In the second embodiment, for example, a configuration may be such that the log acquisition device 10 includes the first DB 7a to the third DB 7c and the console 6 accesses the log acquisition device 10 instead of the center 7. In this case, the center 7 may be omitted.

Log Acquisition Program

Figure 11:
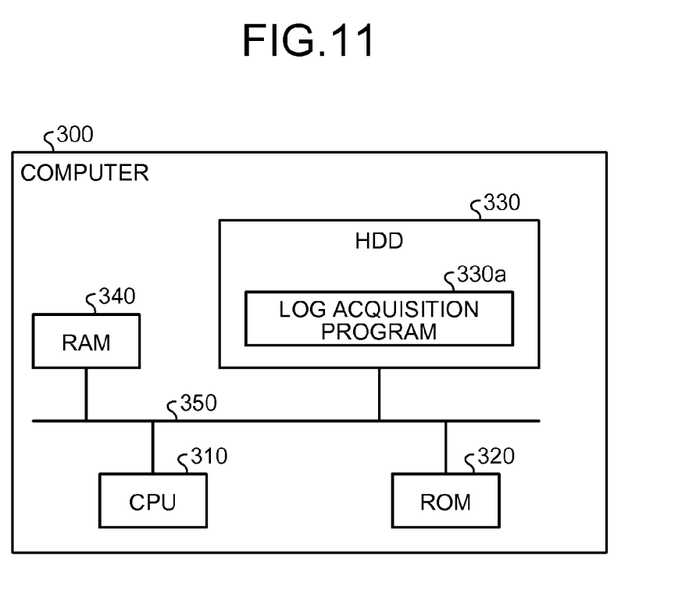
FIG. 11 is a diagram that illustrates a computer that performs a log acquisition program.

Various types of processes performed by the log acquisition device (1, 10) that is described in the above embodiments may be performed when prepared programs are executed by a computer system, such as a personal computer or workstation. In the following, an explanation is given, with reference to FIG. 11, of an example of a computer that executes a program that has the same functionality as that of the log acquisition device described in the above embodiment. FIG. 11 is a diagram that illustrates a computer that performs the log acquisition program.

As illustrated in FIG. 11, a computer 300 includes a CPU 310, a ROM 320, a hard disk drive (HDD) 330, and a RAM 340. The CPU 310, the ROM 320, the HDD 330, and the RAM 340 are connected to one another via a bus 350.

The ROM 320 stores therein basic programs, such as an OS. Furthermore, the HDD 330 pre-stores therein a log acquisition program 330a that performs the same functionality as those of the receiving unit 1a, the acquiring unit 1b, the acquiring unit 10a, and the transmitting unit 10b that are described in the above embodiments. The log acquisition program 330a may be separated as appropriate.

The CPU 310 reads and executes the log acquisition program 330a from the HDD 330.

The above-described log acquisition program 330a does not necessarily need to be stored initially in the HDD 330.

For example, the log acquisition program 330a is stored in a "portable physical medium", such as a flexible disk (FD), a CD-ROM, a DVD disk, a magneto-optical disk, or an IC card, that is inserted into the computer 300. The computer 300 may read and execute the log acquisition program 330a from the above medium.

The log acquisition program 330a is stored in "another computer (or server)", or the like, that is connected to the computer 300 via a public line, the Internet, a LAN, a WAN, or the like. The computer 300 may read and execute the log acquisition program 330a from the above.

It is possible to designate a log acquisition level from a perspective that is easily understandable.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a log acquisition program that causes a computer to execute a process comprising:

receiving information for designating multiple methods configuring an application for which logs are to be acquired and designating a log detail level with respect to each of the multiple methods, the information including a monitoring condition being a condition for selecting a monitoring mode, the monitoring mode being a name of the monitoring mode and a level of priority being a value indicating level of priority;

registering the monitoring condition, the monitoring mode and the level of priority to be related to one another;

registering the monitoring mode, the level of priority, a monitoring detail level of Web layer, a monitoring detail level of business logic layer and a monitoring detail level of data access layer to be related to one another; and acquiring a log of the application with a corresponding log detail level with respect to each of the multiple methods designated, wherein acquiring the log of the application with the corresponding log detail level includes determining the monitoring mode in reference to the monitoring condition of the application; and acquiring a log of the application from the Web layer, the business logic layer and the data access layer with the monitoring detail level corresponding to the monitoring mode determined.

2. The non-transitory computer-readable recording medium according to claim 1, wherein a layered system is configured in which the methods include multiple screen methods and the multiple screens include an input/output item method, and acquiring the log of the application with the corresponding log detail level includes, when different detail levels are selected for different layers with respect to a given method, acquiring a log of the application with a highest detail level among the different detail levels.

3. The non-transitory computer-readable recording medium according to claim 1, wherein acquiring the log of the application with the corresponding log detail level includes referring to contents stored in a storage unit that stores therein, in an associated manner, a type of operation of the application, the methods of the application, and a log detail level with respect to an operation indicated by the type;

determining a log detail level by using the type of operation of the application and the methods designated; and acquiring a log of the application with the log detail level determined.

4. A log acquisition device that acquires a log of an application, the log acquisition device comprising:

a memory; and a processor coupled to the memory, wherein the processor executes a process comprising:

receiving information for designating multiple methods configuring an application for which logs are to be acquired and designating a log detail level with respect to each of the multiple methods, the information including a monitoring condition being a condition for selecting a monitoring mode, the monitoring mode being a name of the monitoring mode and a level of priority being a value indicating level of priority;

registering the monitoring condition, the monitoring mode and the level of priority to be related to one another;

registering the monitoring mode, the level of priority, a monitoring detail level of Web layer, a monitoring detail level of business logic layer and a monitoring detail level of data access layer to be related to one another; and acquiring a log of the application with a corresponding log detail level with respect to each of the multiple methods designated, wherein acquiring the log of the application with the corresponding log detail level includes determining the monitoring mode in reference to the monitoring condition of the application; and acquiring a log of the application from the Web layer, the business logic layer and the data access layer with the monitoring detail level corresponding to the monitoring mode determined.

5. A log acquisition method for causing a computer to execute a process comprising:

receiving information for designating multiple methods configuring an application for which logs are to be acquired and designating a log detail level with respect to each of the multiple methods, the information including a monitoring condition being a condition for selecting a monitoring mode, the monitoring mode being a name of the monitoring mode and a level of priority being a value indicating level of priority;

registering the monitoring condition, the monitoring mode and the level of priority to be related to one another;

registering the monitoring mode, the level of priority, a monitoring detail level of Web layer, a monitoring detail level of business logic layer and a monitoring detail level of data access layer to be related to one another; and acquiring a log of the application with a corresponding log detail level with respect to each of the multiple methods designated, wherein acquiring the log of the application with the corresponding log detail level includes determining the monitoring mode in reference to the monitoring condition of the application; and acquiring a log of the application from the Web layer, the business logic layer and the data access layer with the monitoring detail level corresponding to the monitoring mode determined.

* * * * *